March 26, 1929.  C. P. EISENHAUER  1,706,776
BEARING
Filed Dec. 28, 1925  2 Sheets-Sheet 1

INVENTOR
CHARLES P. EISENHAUER,
BY Toulmin &Toulmin,
ATTORNEYS.

March 26, 1929.   C. P. EISENHAUER   1,706,776
BEARING
Filed Dec. 28, 1925   2 Sheets-Sheet 2

INVENTOR
CHARLES P. EISENHAUER,
BY Toulmin & Toulmin,
ATTORNEYS.

Patented Mar. 26, 1929.

1,706,776

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

BEARING.

Application filed December 28, 1925. Serial No. 77,948.

My invention relates to bearings and in particular to an air or gas-tight bearing.

It is the object of my invention to provide a bearing preferably for use in connection with an electric motor, driving directly a compressor so arranged that the gas in the compressor, which may have access to the motor shaft, cannot leak out of the compressor mechanism along the motor shaft into the motor and thence to the outside atmosphere.

My invention is not to be confined however to this particular use, but this is a typical installation which it is my desire to provide.

It is my object to provide an easily manufactured and easily assembled gas-tight bearing, which will automatically take up the wear and, despite variation of the position of the bearing, will remain gas-tight.

Referring to the drawings.

Figure 1:
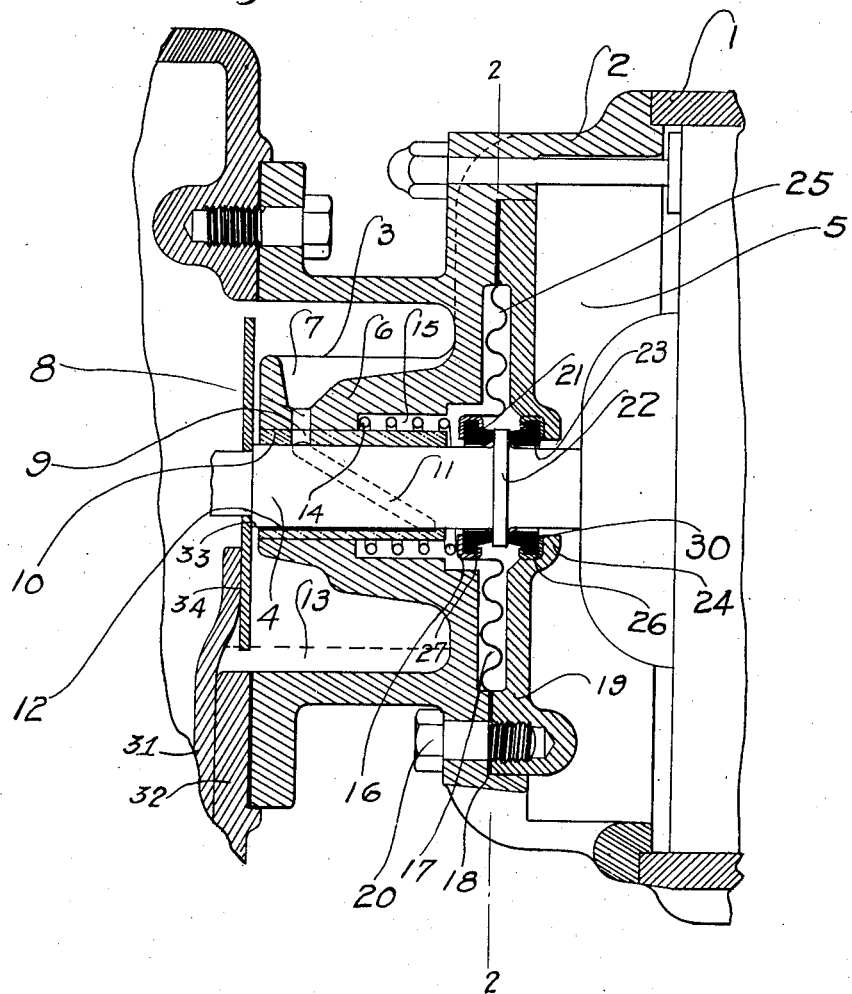
Figure 1 is a section through the bearing, taken vertically, showing the bearing installed on an electric motor.
Figure 2:
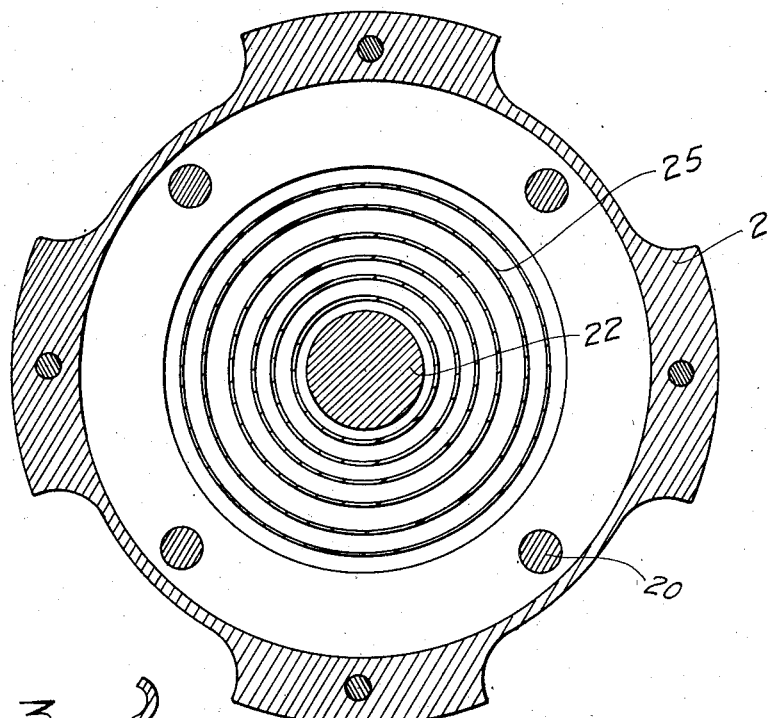
Figure 2 is a section on the line 2—2 of Figure 1.
Figure 3:
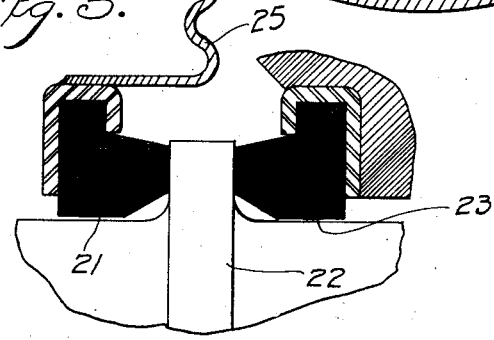
Figure 3 is an enlarged view of the sealing rings and a portion of the diaphragm in section.

Referring to the drawings in detail, 1 is the frame of an electric motor which has bolted thereto a housing 2 of the compressor, or other similar mechanism which contains the gas in the chamber 3 that surrounds the armature shaft 4. It is this gas which it is desired to prevent from leaking along the shaft into the interior of the motor as at 5. The shaft 4 is supported in a sleeve 6 which is provided with a cup 7 for lubricant. This lubricant passes through a passageway 8 in the sleeve and passageway 9 coinciding therewith in a bearing 10 which supports the shaft 4. This lubricant passes in a diagonal path through the passageway 11 and thence back again to the other end of the bearing through a straight passageway 12, where it drops down into a reservoir 13. The exact details of lubrication are not important Around this bearing member 10 is mounted a helical spring 14, one end of which abuts against the sleeve 6 within a cutaway portion 15 within the sleeve 6 while the other end engages with a flange 16 of a corrugated metal diaphragm 17, the periphery of which is embraced at 18 between the retaining plate 19 and the frame 2.

The retaining plate is secured to the frame by the bolts 20. This inner rim of the corrugated diaphragm, which is designated 17, rests upon a hardened bearing member in the form of a ring designated 21, the opposite side of which engages with a hardened steel ring integrally formed on the shaft, such ring being designated 22. On the other side of this ring 22 is a second bearing ring 23 carried on the plate 19, the outside of which is engaged by the shoulder 24 of the retaining plate 19.

Thus, the helical spring forces the bearing members 21, 22 and 23 into constant engagement but the rotation of these bearing members with the shaft will not permit the passage of gas along the shaft, due to the fact that the joint between the bearing members is gas-tight. The diaphragm is gas-tight and its connection between the retaining plate and frame is also gas-tight. The flexibility of the diaphragm results in the maintenance of the gas-tight nature of the bearing during the continuous operation and wear of the bearing members. A space 25 is provided between the retaining plate and the frame for the accommodation of the diaphragm and any minor movements it may have.

It will be noted also that the retaining shoulder 24 on the plate 19 contains a retaining ring 26 for retaining the ring 23. A similar retaining ring 27 is supported on the inner margin of the diaphragm for retaining the ring 21. Both these rings are provided with internally extending edges 30 for holding the rings 21 and 23 firmly in place in the rings 26 and 27, respectively.

It will be understood that I desire to comprehend within my invention such modifications as may be necessary to adapt it to varying conditions and uses.

Because of the fact that the spring member 14 is continually exerting its force through the rings 27 and 21 against the ring 22 on the shaft, said shaft is forced to the right (see Figure 1) against the ring 23 which is held in the shoulder 24 by the ring 26. This construction not only provides a thrust bearing on the right of the sleeve 22 to limit movement to the right of the shaft but is in itself an additional sealing means. If gases should by any possibility escape around the ring 21, their passage to the motor casing 1 would still be resisted by the tight fit of the ring 22 and ring 23 because of the fact that ring 22 is pressed by spring 14 against ring 23.

It will be noted that there is a member 31 attached to the compressor housing 32. This member 31 resists any substantial movement of the shaft 4 to the left because of the fact that said shaft has a shoulder 33 which abuts a ring 34 mounted on said shaft, the ring 34 being resisted in its movement to the left by member 31.

Having thus fully described my invention, what I claim as new and desire to secure by Letters Patent, is:

1. In a gas tight bearing, a shaft, a bearing support for the shaft, a flange on said shaft, sealing members on each side of said flange engaging therewith, means for supporting the said sealing members and retaining them in position, yielding means for retaining the said sealing members in engagement with the flange, and a diaphragm fastened to one of the said sealing members and to the supporting frame to prevent the passage of gas around the said sealing members and the shaft, the said supporting frame having means for supporting the other sealing members in contact with the said flange.

2. In combination, a frame, a sleeve therefor, a bearing in the said sleeve, a shaft supported by the said bearing having a hardened flange thereon, ring members on each side of the said flange on the shaft engaging therewith to form a gas tight fit, a retaining plate mounted on the said sleeve adapted to retain one of the said rings, a helical spring mounted in the said sleeve adapted to retain the other of the said rings, a diaphragm fastened to the outer periphery of the ring, the periphery of the diaphragm being engaged between the retaining plate and the said frame.

3. In combination, an end frame of a motor adapted to inclose the motor on one side and to form a gas chamber on the other, a passageway through the said end frame, a bearing supported in said passageway, a shaft supported in the said bearing, a retaining plate mounted on the said frame having a portion thereof spaced therefrom, and adapted to receive a shaft therethrough, a diaphragm having its outer margin embraced between the retaining plate and the frame and located in a space between the retaining plate and the said frame, its inner margin approaching the said shaft, a sealing ring supported by the inner margin of the said diaphragm and sealed thereto, a second sealing ring supported by the inner margin of the said retaining plate and sealed thereto, a sealing flange mounted between the said rings and on the said shaft as a part thereof, and yielding means carried on the said bearing engaging with one of the said sealing rings of the said diaphragm for maintaining the sealing means in engagement with one another whereby the gas in the gas chamber on one side of the frame cannot pass along the shaft to the motor.

4. In combination, a shaft, a frame having on one side a gas chamber and on the other side a motor chamber, means in the said frame to support a shaft, a retaining plate mounted on the frame but spaced therefrom a portion of its length, gas tight means to resiliently support for lateral movement a sealing ring, a second sealing ring spaced therefrom carried by a retaining plate, the said sealing rings having edges each engaging with a separate projecting shoulder on said shaft, projecting shoulders on the shaft, and yielding means for causing the said sealing rings and the said shoulders to remain in gas tight engagement with one another.

In testimony whereof, I affix my signature.

CHARLES P. EISENHAUER.